(12) United States Patent
Horikawa et al.

(10) Patent No.: US 12,345,653 B2
(45) Date of Patent: Jul. 1, 2025

(54) DEFECT INSPECTION APPARATUS

(71) Applicant: Shimadzu Corporation, Kyoto (JP)

(72) Inventors: Hiroshi Horikawa, Kyoto (JP); Kenji Takubo, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 38 days.

(21) Appl. No.: 18/013,401

(22) PCT Filed: Jul. 2, 2020

(86) PCT No.: PCT/JP2020/026071
§ 371 (c)(1),
(2) Date: Dec. 28, 2022

(87) PCT Pub. No.: WO2022/003916
PCT Pub. Date: Jan. 6, 2022

(65) Prior Publication Data
US 2023/0251204 A1  Aug. 10, 2023

(51) Int. Cl.
*G01N 21/88* (2006.01)
*G01B 9/02* (2022.01)
(Continued)

(52) U.S. Cl.
CPC ..... *G01N 21/8806* (2013.01); *G01B 9/02095* (2013.01); *G01B 9/02098* (2013.01);
(Continued)

(58) Field of Classification Search
CPC ............. G01N 21/8806; G01N 29/045; G01N 2021/1765; G01N 2201/06113; G01B 9/02095; G01B 9/02098
See application file for complete search history.

(56) References Cited

U.S. PATENT DOCUMENTS

| | | | |
|---|---|---|---|
| 6,015,449 A | 1/2000 | Hirota et al. | |
| 8,228,484 B2 * | 7/2012 | Ono | G03F 7/70833 355/53 |

(Continued)

FOREIGN PATENT DOCUMENTS

| | | |
|---|---|---|
| CN | 101576717 A | 11/2009 |
| CN | 107462581 A | 12/2017 |

(Continued)

OTHER PUBLICATIONS

Notice of Reasons for Refusal dated Sep. 26, 2023 for corresponding Japanese Patent Application No. 2022-532965.

(Continued)

*Primary Examiner* — Hung V Nguyen
(74) *Attorney, Agent, or Firm* — Muir Patent Law, PLLC

(57) ABSTRACT

This defect inspection apparatus (100) is provided with an excitation unit (1), a laser illumination unit (2), an interference unit (30), an imaging unit (31), a holding member (4) for holding the imaging unit at a position spaced apart from an inspection target (90) by a predetermined distance, a connecting member (5) for connecting the holding member or the imaging unit and the excitation unit, and a controller (6) for generating an image (61) related to the propagation of an elastic wave on an inspection target.

25 Claims, 9 Drawing Sheets

(51) Int. Cl.
    *G01B 9/02098*     (2022.01)
    *G01N 29/04*     (2006.01)
    *G01N 21/17*     (2006.01)

(52) U.S. Cl.
    CPC ... *G01N 29/045* (2013.01); *G01N 2021/1765* (2013.01); *G01N 2201/06113* (2013.01)

(56) References Cited

U.S. PATENT DOCUMENTS

| | | | |
|---|---|---|---|
| 10,267,618 B2 * | 4/2019 | Hatahori | G01M 7/00 |
| 11,898,926 B2 * | 2/2024 | Moutafis | G01N 29/045 |
| 2003/0030779 A1 * | 2/2003 | Hara | G03F 7/70725 |
| | | | 355/75 |
| 2014/0118530 A1 | 5/2014 | Holmes et al. | |
| 2017/0350690 A1 | 12/2017 | Hatahori et al. | |

FOREIGN PATENT DOCUMENTS

| | | |
|---|---|---|
| JP | H10-227768 A | 8/1998 |
| JP | H10-253604 A | 9/1998 |
| JP | H10-308997 A | 11/1998 |
| JP | 2002-177271 A | 6/2002 |
| JP | 2014-119441 A | 6/2014 |
| JP | 2017-219318 A | 12/2017 |

OTHER PUBLICATIONS

"VibroSherarovis-inspection of adhesive connections" (https://www.edevis.com/content/en/VibroShearovis.php) Feb. 8, 2019.
Written Opinion by the International Searching Authority for PCT application No. PCT/JP2020/026071 dated Sep. 24, 2020.
First Office Action dated Mar. 1, 2025, for corresponding Chinese Patent Application No. 202080103681.8.
Second Office Action dated May 1, 2025, for the corresponding Chinese Patent Application No. 202080103681.8.

* cited by examiner (First modification)

(Second modification)

(Second modification)

(Third modification)

(Fourth modification)

(Fifth modification)

(Sixth modification)

(Seventh modification)

(Eighth modification)

DEFECT INSPECTION APPARATUS

TECHNICAL FIELD

The present invention relates to a defect inspection apparatus.

BACKGROUND ART

Conventionally, a defect inspection apparatus is known. Such a defect inspection apparatus is disclosed, for example, in Japanese Patent No. 6451695.

The above-described Japanese Patent No. 6451695 discloses a defect inspection apparatus provided with an excitation unit for exciting an elastic wave in an inspection target object, an illumination unit for irradiating a measurement region on a surface of the inspection target object with stroboscopic illumination, and a displacement measurement unit. The displacement measurement unit is configured to control the phase of the elastic wave and the timing of the stroboscopic illumination to thereby collectively measure the displacement of at least three phases of the elastic wave different from each other in the front-back direction at each point of the measurement region. The defect inspection apparatus disclosed in the above-described Japanese Patent No. 6451695 images the vibration state (the amplitude and the phase) at each point in the measurement region by the displacement measurement unit. The defect inspection apparatus disclosed in the above-described Patent No. 6451695 generates an image in which the difference in the vibration displacement is represented by the difference in brightness and darkness of the image, based on the vibration state at each point in the imaged measurement region. The defect inspection apparatus disclosed in the above-described Japanese Patent No. 6451695 detects a discontinuous portion of the vibration state as a defect by performing visual or image processing on the generated image.

PRIOR ART DOCUMENT

Patent Document

Patent Document 1: Japanese Patent No. 6451695

SUMMARY OF THE INVENTION

Problems to be Solved by the Invention

However, in the defect inspection apparatus described in the above-described Japanese Patent No. 6451695, it is considered that the relative position between the excitation unit and the imaging unit is not fixed. Therefore, there is a possibility that the relative position between the excitation unit and the imaging unit may be changed for each inspection. When the relative position between the excitation unit and the imaging unit is changed, the vibration state at each point in the measurement region may be changed when the same inspection region (imaging range) is inspected by re-measurement or the like. When the vibration state at each point in the measurement region changes, the inspection reproducibility deteriorates. Therefore, a defect inspection apparatus capable of improving the inspection reproducibility is desired.

The present invention has been made to solve the above-described problems, and an object of the present invention is to provide a defect inspection apparatus capable of improving the inspection reproducibility.

Means for Solving the Problems

In order to attain the above-described object, the defect inspection apparatus according to the present invention includes:

an excitation unit configured to excite an elastic wave in an inspection target;
a laser illumination unit configured to irradiate the inspection target with laser light;
an interference unit configured to cause the laser light reflected from mutually different positions of the inspection target excited by the excitation unit to interfere;
an imaging unit configured to image interfered laser light;
a holding member configured to hold the imaging unit at a position spaced apart from the inspection target by a predetermined distance;
a connecting member configured to connect the holding member or the imaging unit and the excitation unit; and
a controller configured to generate an image related to propagation of the elastic wave of the inspection target, based on the interfered laser light imaged by the imaging unit.

Effects of the Invention

In one aspect of the present invention, as described above, a connecting member for connecting a holding member or an imaging unit and an excitation unit is provided. By providing the connecting member, the excitation unit and the imaging unit are connected via the holding member or directly connected, so that it is possible to prevent the relative position between the excitation unit and the imaging unit from changing. As a consequence, it is possible to provide a defect inspection apparatus capable of improving the inspection reproducibility.

EMBODIMENTS FOR CARRYING OUT THE INVENTION

Hereinafter, some embodiments in which the present invention is embodied will be described with reference to the attached drawings.

Referring to FIG. 1 to FIG. 6, the configuration of a defect inspection apparatus 100 according to one embodiment of the present invention will be described.

(Configuration of Defect Inspection Apparatus)

Figure 1:
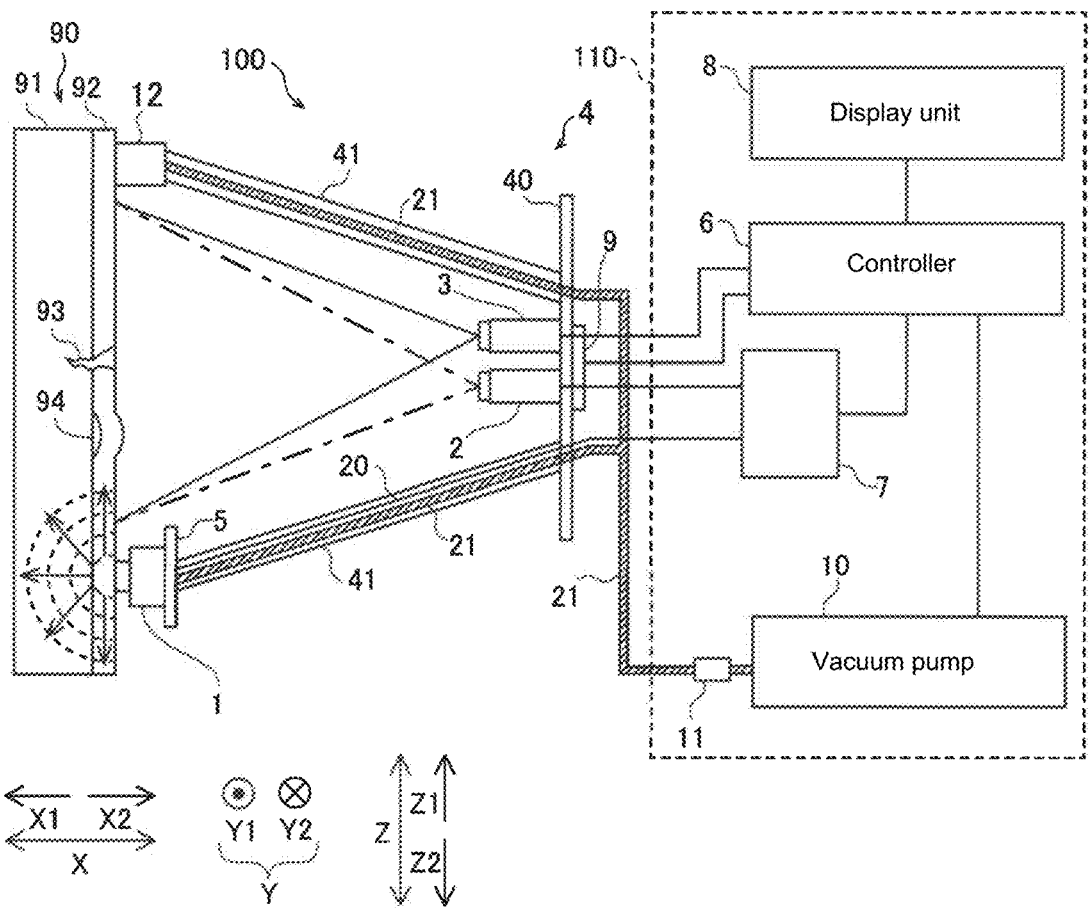
FIG. 1 is a schematic diagram showing an entire configuration of a defect inspection apparatus according to one embodiment.

As shown in FIG. 1, the defect inspection apparatus 100 is provided with an excitation unit 1, a laser illumination unit 2, a speckle-shearing interferometer 3, a holding member 4, a connecting member 5, a controller 6, a signal generator 7, a display unit 8, an operation input unit 9, and a vacuum pump 10.

The excitation unit 1 receives an electric signal from the signal generator 7 to excite an elastic wave in an inspection target 90. The electric signal received by the excitation unit 1 from the signal generator 7 includes, for example, an AC pulse signal. The excitation unit 1 is arranged to come into contact with the inspection target 90, converts the AC electric signal from the electric signal generator 7 to mechanical vibrations, and excites an elastic wave in the inspection target 90. The detailed configuration of the excitation unit 1 will be described later.

The laser illumination unit 2 receives the electric signal from the signal generator 7 and irradiates the inspection target 90 with laser light. The laser illumination unit 2 includes a laser light source (not shown) and an illumination light lens (not shown). The illumination light lens emits the laser light emitted from the laser light source by spreading it over the inspection area 90a (see FIG. 2) on the surface of the inspection target 90.

The excitation unit 1 and the laser illumination unit 2 are connected to the signal generator 7 via a cable 20.

The speckle-shearing interferometer 3 is configured to cause the laser light reflected from mutually different positions of the inspection target 90 excited by the excitation unit 1 to interfere. The detailed configuration of the speckle-shearing interferometer 3 will be described later.

The holding member 4 is configured to be capable of holding the speckle-shearing interferometer 3 at a position spaced apart from the inspection target 90 by a predetermined distance. Further, the holding member 4 is configured to be capable of arranging the laser illumination unit 2 at a position spaced apart from the inspection target 90 by a predetermined distance.

Further, the holding member 4 is provided with an interferometer holder 40 for holding the speckle-shearing interferometer 3, and a plurality of legs 41 provided on the interferometer holder 40. The excitation unit 1 is provided on any one of the plurality of legs 41 via the connecting member 5. Note that the interferometer holder 40 is one example of the "imaging unit holder" recited in claims.

Further, the plurality of legs 41 is each provided with a suction portion 12 for supporting the holding member 4 by suctioning the inspection target 90.

The connecting member 5 is provided for connecting the excitation unit 1 and the holding member 4. Specifically, the excitation unit 1 is connected to one end face of the connecting member 5. Further, the holding member 4 is connected to the other end face of the connecting member 5. In this embodiment, the connecting member 5 has a flat plate shape. The connecting member 5 is configured to connect the holding member 4 or the speckle-shearing interferometer 3 and the excitation unit 1. In the example shown in FIG. 1, the connecting member 5 connects the holding member 4 and the excitation unit 1. The detailed configuration of the connecting member 5 will be described later.

The controller 6 is configured to control the speckle-shearing interferometer 3 to generate an image 61 (see FIG. 4) related to the propagation of the elastic wave. The controller 6 is configured to control the signal generator 7 to transmit an AC electric signal to the excitation unit 1. Further, the controller 6 is configured to transmit an electric signal to the laser illumination unit 2. The controller 6 is configured to control a solenoid valve 11 to reduce the pressure in a recessed portion 12a (see FIG. 6) of the suction portion 12 by using a vacuum pump 10. The controller 6 is configured by a computer including a processor, such as, e.g., a CPU (Central Processing Unit) and an FPGA (Field Programmable Gate Array), a GPU (Graphics Processing Unit), and a volatile and/or nonvolatile memory.

The signal generator 7 is configured to generate an AC electric signal to be transmitted to the excitation unit 1 under the control of the controller 6. Further, the signal generator 7 is configured to generate an electric signal to be transmitted to the laser illumination unit 2 under the control of the controller 6.

The display unit 8 is configured to display the image 61 related to the propagation of the elastic wave in the inspection target 90 generated by the controller 6. The display unit 8 includes, for example, a liquid crystal monitor.

The operation input unit 9 is configured to accept operation inputs by an inspector. The operation input unit 9 includes, for example, a touch panel.

The vacuum pump 10 is configured to suction a gas in the recessed portion 12a (see FIG. 6) of the suction portion 12 under the control of the controller 6. The vacuum pump 10 suctions the gas in the recessed portion 12a of the suction portion 12, so that the suction portion 12 suctions the inspection target 90.

In this embodiment, the controller 6, the signal generator 7, and the display unit 8 are provided in a portable control device 110. The control device 110 is provided with, for example, shoulder straps (not shown). This allows the inspector to perform the inspection of the inspection target 90 with the control device 110 on its back. Further, the vacuum pump 10 is provided on the control device 110 so as to be carried together with the control device 110.

The inspection target 90 is, for example, a structural object. Specifically, the inspection target 90 is an airframe of an airplane. More specifically, the inspection target 90 is a coated steel sheet coated with a coated film 92 on a surface of a steel sheet 91, which is used in an airframe of an airplane. The defect inspection apparatus 100 inspects defects of the inspection target 90. In FIG. 1, an example is shown in which the inspection target 90 in which cracks 93 and separation 94 have been generated as defects is inspected.

Figure 2:
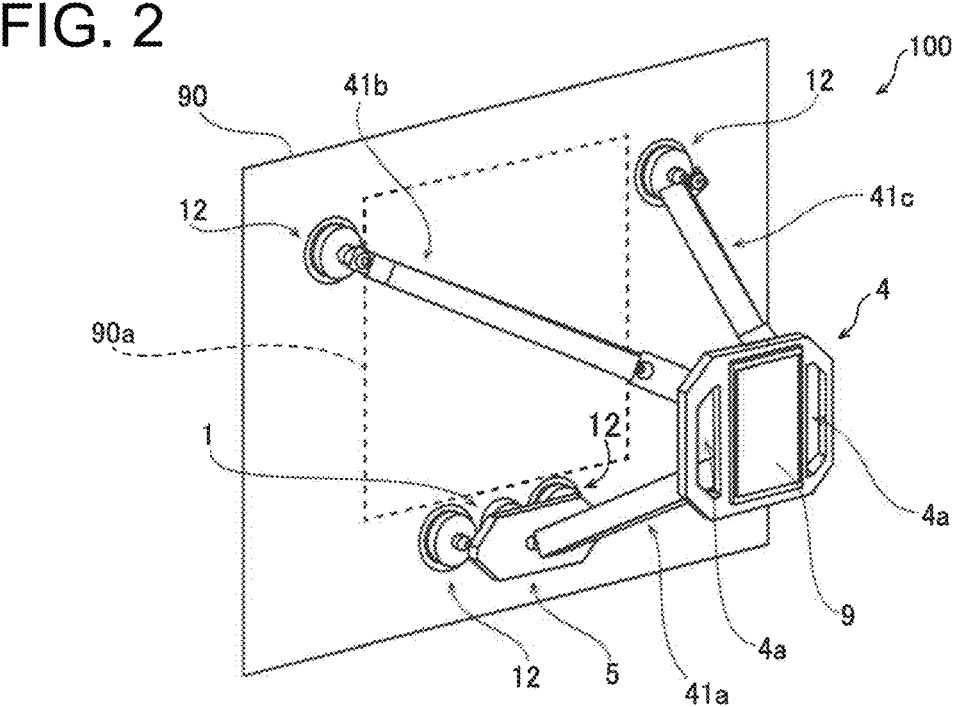
FIG. 2 is a perspective view of the defect inspection apparatus according to the embodiment.

As shown in FIG. 2, the defect inspection apparatus 100 according to this embodiment is configured to inspect the inspection target 90 in a state in which the laser illumination unit 2 and the speckle-shearing interferometer 3 and the inspection target 90 (inspection area 90a) are arranged in a direction to face with each other. Specifically, the defect inspection apparatus 100 is configured to irradiate the inspection area 90a of the inspection target 90 with laser light.

In this embodiment, the holding member 4 includes a first leg 41a, a second leg 41b, and a third leg 41c, as a plurality of legs 41. The excitation unit 1 is provided to any one of the plurality of legs 41. In the example shown in FIG. 2, the excitation unit 1 is provided on the first leg 41a. The excitation unit 1 is provided on the first leg 41a via the connecting member 5 with its relative position with respect to the first leg 41a substantially fixed.

Further, the excitation unit 1 is provided on the first leg 41a so that when the first leg 41a is brought into contact with the inspection target 90, the excitation unit 1 is brought into contact with the inspection target 90 at a preset position where the relative position with respect to the speckle-shearing interferometer 3 is set in advance. Note that the preset position denotes a position where the relative position of the excitation unit 1 with respect to the speckle-shearing interferometer 3 becomes substantially equal for each inspection.

Further, the holding member 4 is provided with gripping portions 4a. The inspector brings the defect inspection apparatus 100 into contact with the inspection target 90 with the gripping portions 4a gripped and operates the operation input unit 9 to cause the defect inspection apparatus 100 to suction the inspection target 90. Note that the defect inspection apparatus 100 can be fixed in a state of being in contact with the inspection target 90 via the suction portions 12, and therefore, the inspector can perform an inspection without gripping the defect inspection apparatus.

(Speckle-Shearing Interferometer)

Next, the configuration of the speckle-shearing interferometer 3 in this embodiment will be described with reference to FIG. 3.

Figure 3:
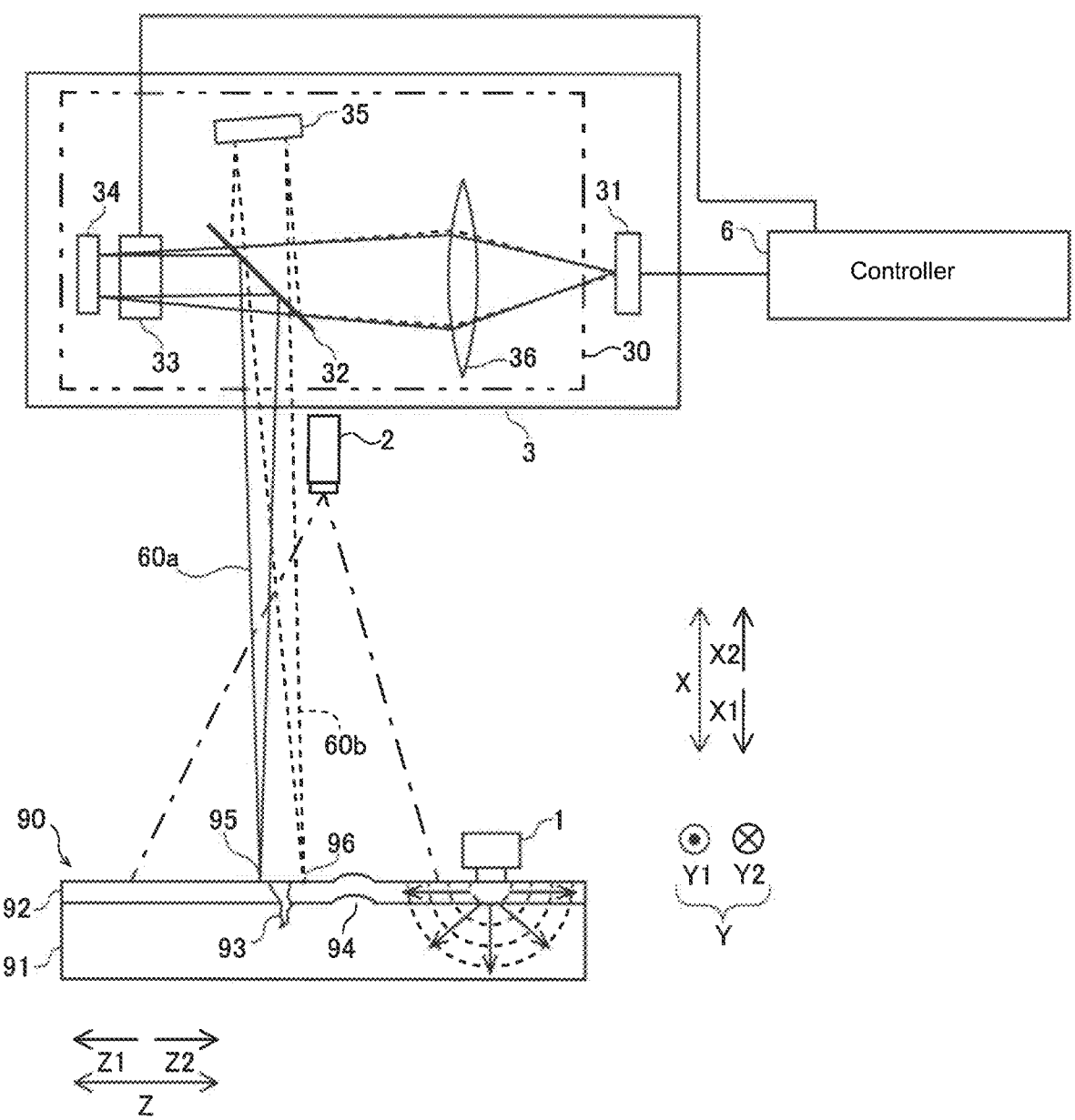
FIG. 3 is a block diagram describing the configuration of a speckle-shearing interferometer.

As shown in FIG. 3, the speckle-shearing interferometer 3 includes an interference unit 30 and an image sensor 31. The interference unit 30 includes a beam splitter 32, a phase shifter 33, a first reflecting mirror 34, a second reflecting mirror 35, and a condenser lens 36. Note that the image sensor 31 is one example of the "imaging unit" recited in claims.

The beam splitter 32 is a half mirror and is arranged at a position on which the laser light reflected from the inspection target 90 is incident.

The first reflecting mirror 34 is arranged at an angle of 45 degrees with respect to the reflection surface of the beam splitter 32 on the optical path of the laser light reflected by the beam splitter 32.

The second reflecting mirror 35 is arranged on the optical path of the laser light transmitted through the beam splitter 32 at an angle slightly inclined from an angle of 45 degrees with respect to the reflection surface of the beam splitter 32.

The phase shifter 33 is arranged between the beam splitter 32 and the first reflecting mirror 34 and is configured to change (shift) the phase of the transmitted laser light under the control of the controller 6. The phase shifter 33 includes, for example, an optical member. The optical member constituting the phase shifter 33 includes, for example, a composite lens pair in which two lenses different in the refractive index of the transmitting laser light are integrated.

The image sensor 31 has a large number of detecting elements. The image sensor 31 is arranged on an optical path of the laser light 60a reflected by the first reflecting mirror 34 after it is reflected by the beam splitter 32 and passes through the beam splitter 32, and an optical path of the laser light 60b reflected by the second reflecting mirror 35 after it is transmitted through the beam splitter 32 and is reflected by the beam splitter 32.

The condenser lens 36 is arranged between the beam splitter 32 and the image sensor 31 to collect the laser light 60a transmitted through the beam splitter 32 and the laser light 60b reflected by the beam splitter 32.

The laser light 60a reflected by the A point 95 on the surface of the inspection target 90 and the first reflecting mirror 34 and the laser light 60b reflected by the B point 96 on the surface of the inspection target 90 and the second reflecting mirror 35 interfere with each other and are incident on the same point of the image sensor 31.

The controller 6 operates the phase shifter 33 arranged in the speckle-shearing interferometer 3 by an actuator (not shown) to change the phase of the transmitted laser light. This changes the phase difference between the laser light reflected at the A point 95 and the laser light reflected at the B point 96. Each detecting element of the image sensor 31 detects the intensity of the interference light interfered by the two laser light.

(Image related to Propagation of Elastic Wave)

The controller 6 controls the vibrations of the excitation unit 1 and the timing of illumination of the laser light of the laser illumination unit 2 via the signal generator 7 and captures an image while changing the phase shift amount. The phase shift amount is changed by $\lambda/4$. The controller 6 causes to capture 32 images at the timing j (j=0 to 7) of the laser irradiation at each phase shift amount (0, $\lambda/4$, $\lambda/2$, and $3\lambda/4$). Further, the controller 6 causes to capture a total of 5 images at the time of turning off the light, before capturing the image, while capturing the image of each phase (0, $\lambda/4$, $\lambda/2$, and $3\lambda/4$), and after capturing the image. That is, the controller 6 causes to capture a total of 37 images. Note that $\lambda$ denotes the wavelength of the laser light L.

The controller 6 processes the detection signal from each detecting element in the following procedure to acquire the image 61 related to the propagation of the elastic wave.

The optical phase (the phase difference between two optical paths when the phase shift amount is 0) $\Phi j$ is obtained from the luminance values $Ij0$ to $Ij3$ of images (by four images) which are the same in the timing j (j=0 to 7) of the laser irradiation and different in the phase shift amount by $\lambda/4$, by Formula (1).

$$\Phi j = -\arctan\{(Ij3-Ij1)/(Ij2-Ij0)\} \tag{1}$$

For the optical phase $\Phi j$, a sinusoidal approximation is performed by a least squares method, and approximation factors A, θ, and C in Formula (2) are acquired.

$$\Phi j = A\cos(\theta + j\pi/4) + C = B\exp(j\pi/4) + C \tag{2}$$

where B is a complex amplitude and is expressed by Formula (3).

$$B = A\exp(i\theta): \text{complex amplitude} \tag{3}$$

Here, the complex amplitude B is image information (two-dimensional space information of a complex amplitude) that is a basis for outputting the image 61 related to the propagation of the elastic wave. From the approximate expression obtained by removing the constant term C from Formula (2), an image 61 constituting a moving image (30 to 60 frames) displaying the optical phase change at each phase time $\xi$ ($0 \leq \xi < 2\pi$) of vibrations and related to the propagation of the elastic wave is output. Note that in the above-described process, a spatial filter may be adopted as appropriate to the complex amplitude B to remove noises. Further, the step of the phase shift amount or the laser irradiation timing (in the above example, $\lambda/4$ and $T/8$, respectively, where T is a period of vibrations) is not limited thereto. In this case, the calculation expression is different from the above-described Formulas (1) to (3).

Figure 4:
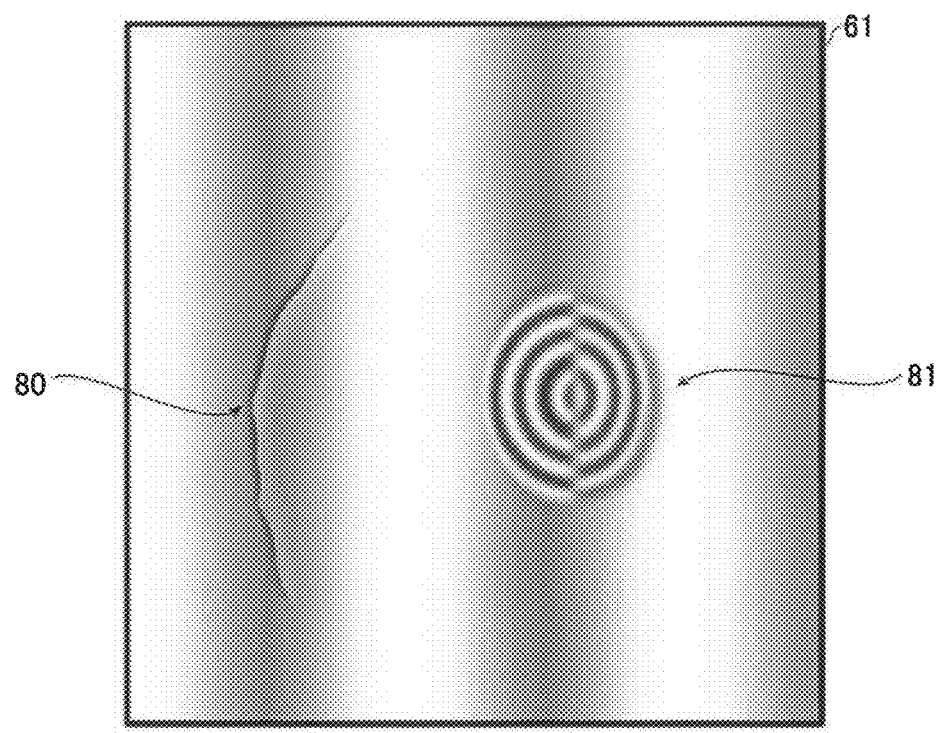
FIG. 4 is a diagram showing one example of an image related to the propagation of an elastic wave.

In a case where the inspection target 90 has defects, as shown in FIG. 4, in the image 61 related to the propagation of the elastic wave, a portion 80 in which the vibration state is discontinuous and a portion 81 in which the vibration state is discontinuous occur. The inspector can determine whether the inspection target 90 has defects by confirming the portion 80 and the portion 81 in which the vibration state generated in the image 61 related to the propagation of the elastic wave is discontinuous. Note that FIG. 4 shows an example in which when a crack 93 is generated as a defect, and the portion 80 discontinuous in the vibration state is generated. Further note that FIG. 4 shows an example in which when a separation 94 is generated as a defect, the portion 81 discontinuous in the vibration state is generated.

(Excitation Unit)

Next, the configuration of the excitation unit 1 in this embodiment will be described with reference to FIG. 5.

Figure 5:
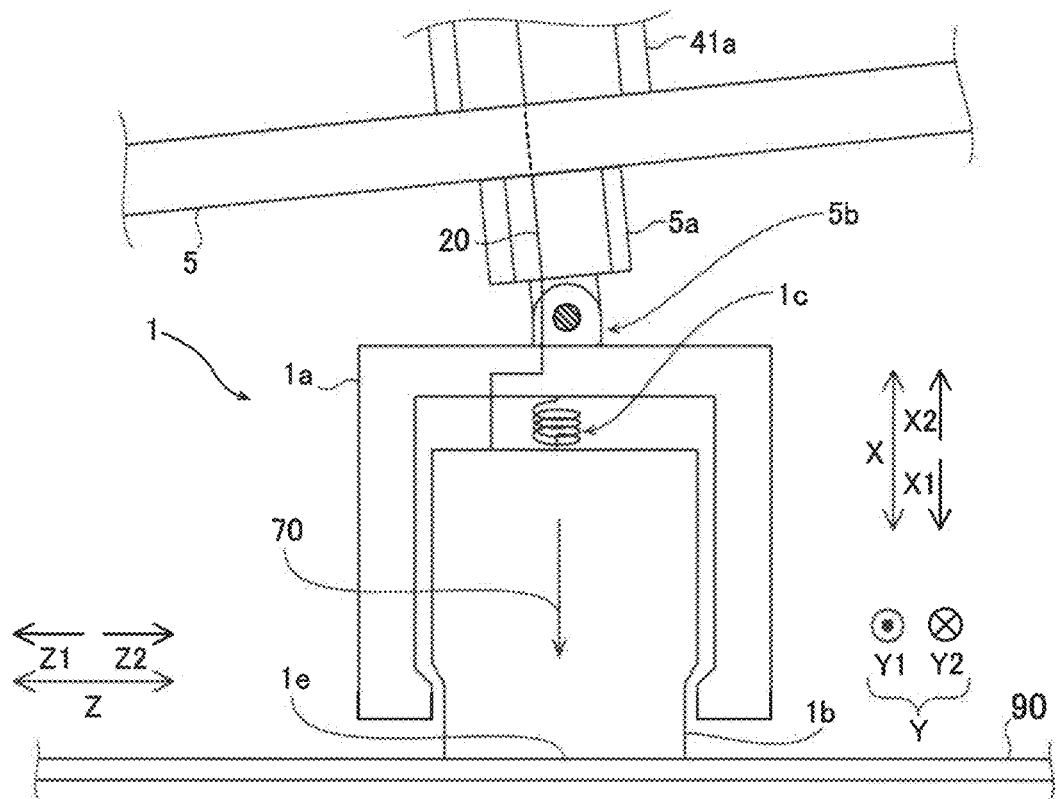
FIG. 5 is a schematic cross-sectional view of an excitation unit according to the embodiment.

As shown in FIG. 5, the excitation unit 1 is configured by a housing 1a, a vibrator 1b, and a vibration absorbing member 1c.

The housing 1a is connected to the first leg 41a via the connecting member 5. Specifically, the housing 1a is connected to the connecting member 5 via the excitation unit connecting member 5a. The excitation unit connecting member 5a has a joint portion 5b. The housing 1a is provided on the excitation unit connecting member 5a so as to be pivotable about the joint portion 5b. Therefore, even in a case where the first leg 41a is not perpendicular to the inspection target 90, it is possible to bring the excitation unit 1 into contact with the inspection target 90 perpendicularly by pivoting the excitation unit 1 by the joint portion 5b.

Inside the housing 1a, the vibrator 1b and the vibration absorbing member 1c are provided. The vibrator 1b is configured to be supplied by a current through the cable 20. The vibrator 1b converts the supplied current into a voltage to vibrate the vibration surface 1e of the vibrator 1b in the X-direction. By bringing the vibration surface 1e into contact with the inspection target 90, the vibrator 1b is configured to excite an elastic wave in the inspection target 90. The vibrator 1b includes, for example, a piezoelectric element.

The vibration absorbing member 1c is provided between the excitation unit 1 and the speckle-shearing interferometer 3 (image sensor 31). That is, the vibration absorbing member 1c is provided in the middle of the connection structure between the excitation unit 1 and the image sensor 31. Specifically, the vibration absorbing member 1c is provided between the housing 1a and the vibrator 1b. The vibration absorbing member 1c is provided to absorb vibrations from the excitation unit 1. The vibration absorbing member 1c includes, for example, an elastic member. The elastic member is, for example, a spring. The vibration absorbing member 1c is constituted by a spring having an appropriate spring constant based on the amplitude, the frequency, etc., of vibrations of the vibrator 1b so that the vibrations of the vibrator 1b can be suppressed from propagating to the housing 1a.

The vibration absorbing member 1c is configured to apply a biasing force for biasing the vibrator 1b in the direction of the arrow 70 against the vibrator 1b. That is, in the example shown in FIG. 5, the vibration absorbing member 1c is arranged between the housing 1a and the vibrator 1b in a state of being reduced in length from the natural length.

Figure 6:
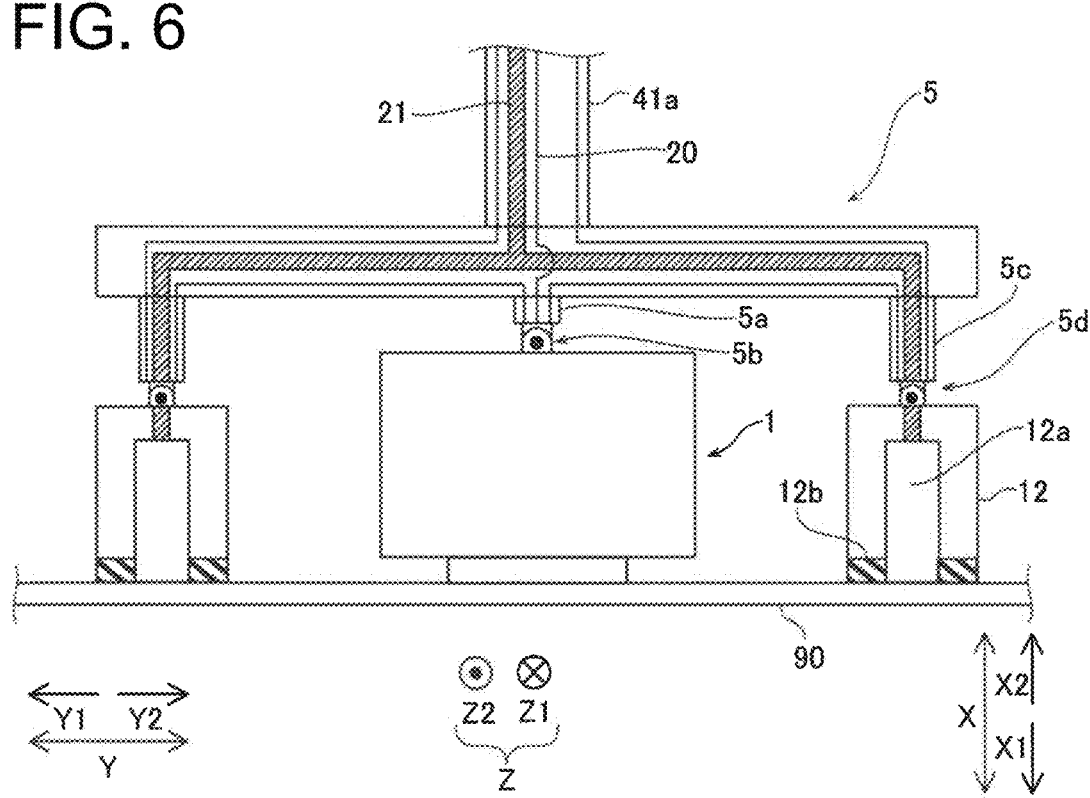
FIG. 6 is a schematic cross-sectional view of an excitation unit and a suction portion provided on a connecting member according to the embodiment.

As shown in FIG. 6, the excitation unit 1 is provided on the first leg 41a together with the suction portions 12. Specifically, the excitation unit 1 is provided on the first leg 41a together with a plurality of suction portions 12 via the connecting member 5. In this embodiment, the excitation unit 1 is arranged between two suction portions 12. Further, the excitation unit 1 and the plurality of suction portions 12 are arranged along the Y-direction. Accordingly, it is possible to prevent the suction portions 12 from being placed in the inspection area 90a (see FIG. 2).

The suction portion 12 includes a recessed portion 12a and a close contact portion 12b which comes into close contact with the inspection target 90. The recessed portion 12a is provided in the suction portion 12 such that the open-end face can come into contact with the inspection target 90. The close contact portion 12b is constituted by an elastic member. The close contact portion 12b includes, for example, a rubber member and the like. The close contact portion 12b is provided so as to surround the entire periphery of the opening-side end face of the recessed portion 12a. Accordingly, when the suction portion 12 is brought into contact with the inspection target 90, a closed space is formed by the recessed portion 12a, the close contact portion 12b, and the inspection target 90. Further, the suction portion 12 is connected to the vacuum pump 10 via the tube 21. The suction portion 12 is configured such that the gas in the closed space is suctioned by the vacuum pump 10 through the tube 21 to reduce the pressure in the closed space, thereby suctioning the inspection target 90.

Further, the connecting member 5 includes a suction portion connecting member 5c. The suction portion 12 is connected to the connecting member 5 via the suction portion connecting member 5c. The suction portion connecting member 5c has a joint portion 5d. The suction portion 12 is provided on the suction portion connecting member 5c so as to be rotatable about the joint portion 5d. Thus, even in a case where the first leg 41a is not perpendicular to the inspection target 90, it is possible to bring the suction portion 12 into contact with the inspection target 90 perpendicularly by rotating the suction portion 12 by the joint portion 5d. Therefore, the holding member 4 can be stably supported by the suction portion 12.

Further, in this embodiment, the plurality of legs 41 each has a hollow cylindrical shape. Further, the connecting member 5 is formed in a hollow shape. The cable 20 is housed inside the first leg 41a. Further, the tube 21 is housed inside the first leg 41a.

Effects of this Embodiment

In this embodiment, the following effects can be obtained.

In this embodiment, by configuring as described above, since the excitation unit 1 and the imaging unit (image sensor 31) are connected via the holding member 4, it is possible to prevent the relative position between the excitation unit 1 and the imaging unit (image sensor 31) from changing. As a result, the inspection reproducibility can be improved.

Further, in this embodiment, as described above, the vibration absorbing member 1c arranged between the excitation unit 1 and the imaging unit (image sensor 31) to absorb vibrations from the excitation unit 1 is further provided. With this, it is possible to prevent the vibrations from the excitation unit 1 from propagating to the imaging unit (image sensor 31). Consequently, it is possible to suppress vibrations of the imaging unit (image sensor 31) due to the vibrations from the excitation unit 1, which makes it possible to suppress noises from generating in the image 61 related to the propagation of the elastic wave due to vibrations of the imaging unit (image sensor 31).

Further, in this embodiment, as described above, the holding member 4 is provided with the imaging unit holder (interferometer holder 40) for holding the imaging unit (image sensor 31) and a plurality of legs 41 provided on the imaging unit holder (interferometer holder 40). The excitation unit 1 is provided on any one of legs 41 (first leg 41a) out of the plurality of legs 41 via the connecting member 5. With this configuration, the excitation unit 1 and the imaging unit (image sensor 31) are connected via the connecting member 5 and the first leg 41a, and therefore, it is possible to easily suppress the change in the relative position of the excitation unit 1 with respect to the imaging unit (image sensor 31).

Further, in this embodiment, as described above, the excitation unit 1 is provided on the first leg 41a so as to come into contact with the inspection target 90 at a position where the relative position with respect to the imaging unit (image sensor 31) is set in advance when the first leg 41a is brought into contact with the inspection target 90. With this configuration, it is possible to easily suppress the change of the relative position between the excitation unit 1 and the imaging unit (image sensor 31) for each inspection. As a result, it is possible to suppress the deterioration of the inspection reproducibility.

Further, in this embodiment, as described above, the excitation unit 1 includes the housing 1a, the vibrator 1b, and the vibration absorbing member 1c, the housing 1a is connected to the first leg 41a via the connecting member 5, the vibrator 1b and the vibration absorbing member 1c are provided in the housing 1a, and the vibration absorbing member 1c is provided between the housing 1a and the vibrator 1b. Accordingly, it is possible to suppress the propagation of the vibrations from the vibrator 1b to the housing 1a by the vibration absorbing member 1c. Consequently, it is possible to suppress the propagation of the vibrations from the vibrator 1b to the imaging unit (image sensor 31) via the housing 1a, the connecting member 5, and the first leg 41a. Further, since the vibrator 1b can be biased by the vibration absorbing member 1c, the vibrator 1b can be brought into close contact with the inspection target 90. Consequently, even in a case where the inspection target 90 is not flat, an elastic wave can be excited with respect to the inspection target 90, so that the inspection accuracy can be improved.

Further, in this embodiment, as described above, the plurality of legs 41 are each provided with the suction portion 12 for supporting the holding member 4 by suctioning the inspection target 90, and the excitation unit 1 is provided on the first leg 41a together with the suction portion 12. As a result, the suction portion 12 supports the holding member 4 and the excitation unit 1, and therefore, the inspector can perform an inspection without supporting the holding member 4. Consequently, it is possible to reduce the burden on the inspector as compared with the configuration in which an inspection is performed in a state in which the holding member 4 is supported by the inspector. Further, since the inspector can perform an inspection without supporting the holding member 4, it is possible to prevent vibrations from being transmitted to the holding member 4. Consequently, it is possible to suppress generation of noises in the image 61 related to the propagation of the elastic wave. Further, as in a fifth modification which will be described later, in the case of performing an inspection of the inspection target 90 in the Z2-direction, it may be configured such that the plurality of legs 41 is provided with a contact member 13 that comes into contact with the inspection target 90, and the excitation unit 1 is provided on the first leg 41a together with the contact member 13. Even with this configuration, the same advantages as those of the configuration in which the excitation unit 1 is provided together with the suction portion 12 can be obtained.

In this embodiment, as described above, the excitation unit 1 is provided on the first leg 41a together with the plurality of suction portions 12. Thus, the excitation unit 1 can be brought into close contact with the inspection target 90 by the plurality of suction portions 12. Therefore, unlike the configuration in which the inspector performs an inspect by bringing the excitation unit 1 into contact with the inspection target 90, the excitation unit 1 can be brought into close contact with the inspection target 90 by a predetermined suction force. As a consequence, the degree of adhesion of the excitation unit 1 can be suppressed from changing for each inspection, and therefore, the inspection reliability can be improved.

Further, in this embodiment, as described above, the excitation unit 1 is configured to excite an elastic wave with respect to the inspection target 90 by supplying a current through the cable 20, and the cable 20 is accommodated in the first leg 41a. With this configuration, for example, as compared with the configuration in which the cable 20 is not accommodated in the first leg 41a, it is possible to prevent the routing of the cable 20 from becoming complicated. As a result, the inspection workability can be improved.

Modified Embodiments

It should be understood that the embodiments disclosed here are examples in all respects and are not restrictive. The scope of the present invention is indicated by the appended claims rather than by the descriptions of the above-described embodiments and includes all modifications (changes) within the meanings and the scopes equivalent to the claims.
(First Modification)

Figure 7:
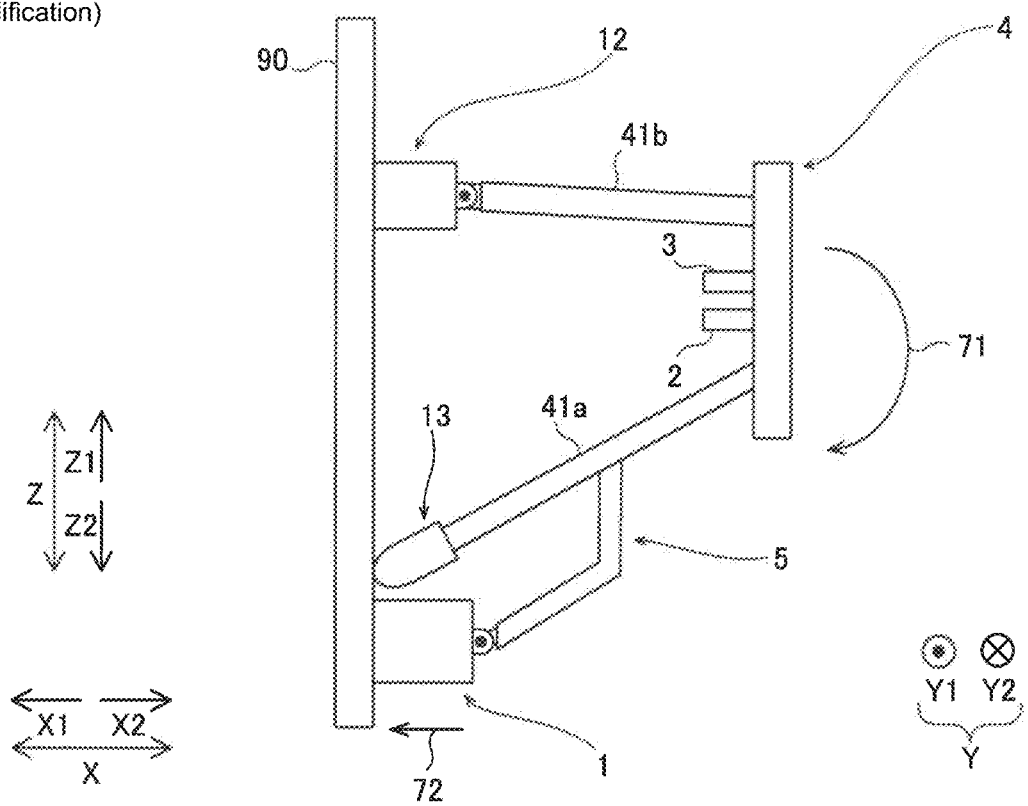
FIG. 7 is a schematic diagram of a defect inspection apparatus according to a first modification.

For example, in the above-described embodiment, an example is shown in which the excitation unit 1 is provided on the connecting member 5 together with the suction portion 12, but the present invention is not limited thereto. For example, as shown in FIG. 7, the excitation unit 1 may be provided on the first leg 41a together with the contact member 13. The contact member 13 is formed of, for example, a plastic member or an elastic member. Further, the suction portion 12 is provided on the second leg 41b and the third leg 41c on which the excitation unit 1 is not provided.

In the case of inspecting a side surface of an airframe of an aircraft by using the defect inspection apparatus 100, the defect inspection apparatus 100 is arranged such that the second leg 41b and the third leg 41c are on the upper side (Z1-side), and the first leg 41a is on the lower side (Z2-side). By arranging the defect inspection apparatus 100 as described above, a moment as indicated by the arrow 71 is generated with respect to the holding member 4. Therefore, a force for biasing the inspection target 90 is applied to the excitation unit 1 as indicated by the arrow 72. Therefore, even in a configuration in which the excitation unit 1 and the suction portion 12 are not provided, the excitation unit 1 can be brought into close contact with the inspection target 90.

In the first modification, by configuring as described above, as compared with the configuration in which the excitation unit 1 is provided together with the suction portion 12, it is possible to suppress an increase in the number of components. Further, as compared with the configuration in which the excitation unit 1 is provided together with the suction portion 12, it is possible to suppress an increase in the force applied to the excitation unit 1. Therefore, it is possible to suppress that the excitation unit 1 is pressed against the inspection target 90 more than required to thereby suppress the reduction of the amplitude of the elastic wave propagated from the excitation unit 1. As a consequence, it is possible to suppress the decrease in the inspection accuracy due to the decrease in the amplitude of the elastic wave.

(Second Modification)

Figure 8:
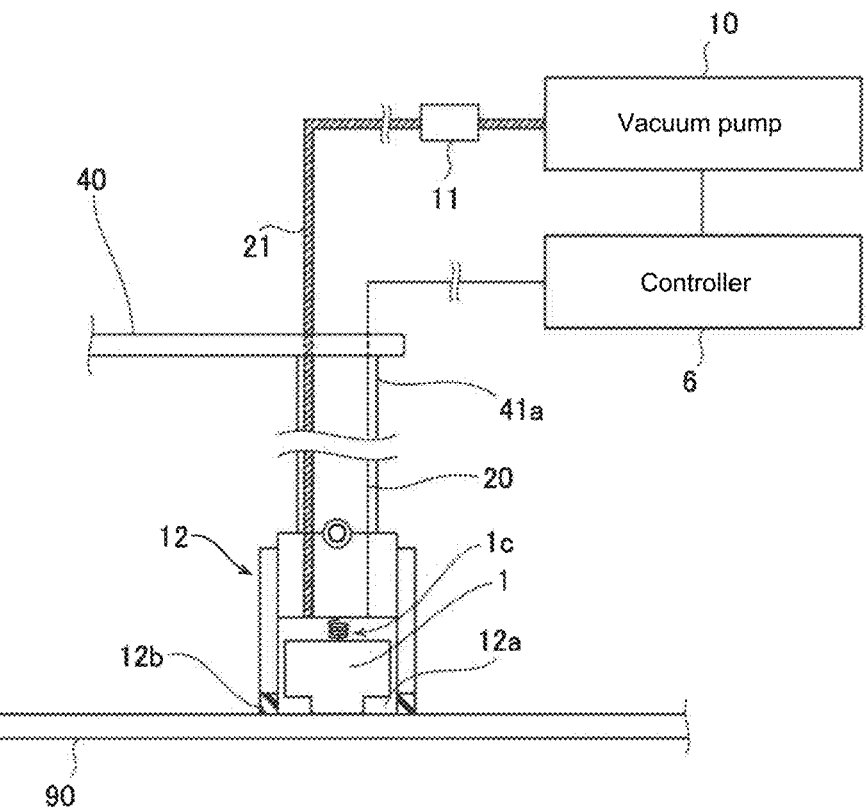
FIG. 8 is a schematic diagram of a configuration in which an excitation unit is provided on an inner side of a suction portion in a defect inspection apparatus according to a second modification.
Figure 9:
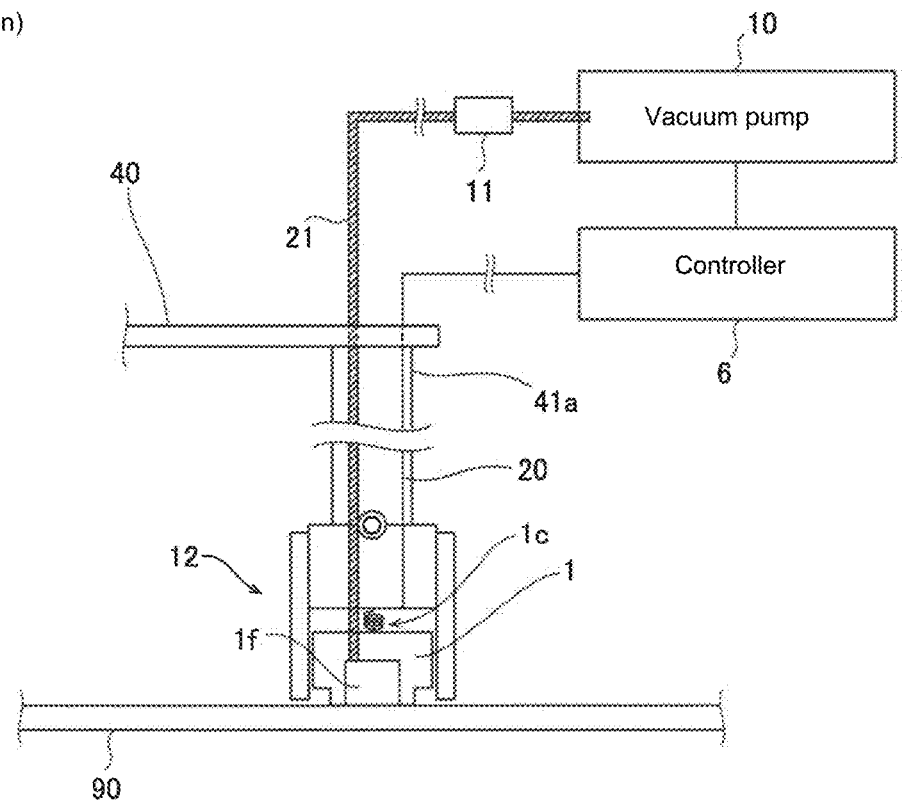
FIG. 9 is a schematic diagram of a configuration in which an excitation unit is provided on an outer side of a suction portion in a defect inspection apparatus according to a second modification.

Further, in the above-described embodiment, an example is shown in which the excitation unit 1 is provided together with the suction portion 12, but the present invention is not limited thereto. For example, the excitation unit 1 may be integrally provided inside or outside the suction portion 12. Specifically, as shown in FIG. 8, the excitation unit 1 is integrally formed inside the suction portion 12 by providing the excitation unit 1 in the recessed portion 12a of the suction portion 12. Note that in the example shown in FIG. 8, although the excitation unit 1 is integrally formed inside the suction portion 12, the excitation unit 1 may be integrally formed outside the suction portion 12 as shown in FIG. 9. Specifically, the suction portion 12 may be formed by providing a recessed portion 1f on the inner side surface of the excitation unit 1 that comes into contact with the inspection target 90 and reducing the pressure in the recessed portion 1f by the vacuum pump 10.

In the second modification, by configuring as described above, as compared with the configuration in which the suction portion 12 and the excitation unit 1 are provided on the first leg 41a, the number of components to be attached to the first leg 41a can be suppressed from increasing. Further, the excitation unit 1 and the suction portion 12 can be integrated, which makes it possible to suppress the complication of routing of the holding member 4.

(Third Modification)

In the above-described embodiment, an example is shown in which the excitation unit 1 is provided in a state in which the relative position with respect to the first leg 41a is substantially fixed via the connecting member 5, but the present invention is not limited thereto. For example, the connecting member 5 may be configured to be able to adjust the position of the excitation unit 1 which comes into contact with the inspection target 90.

Figure 10:
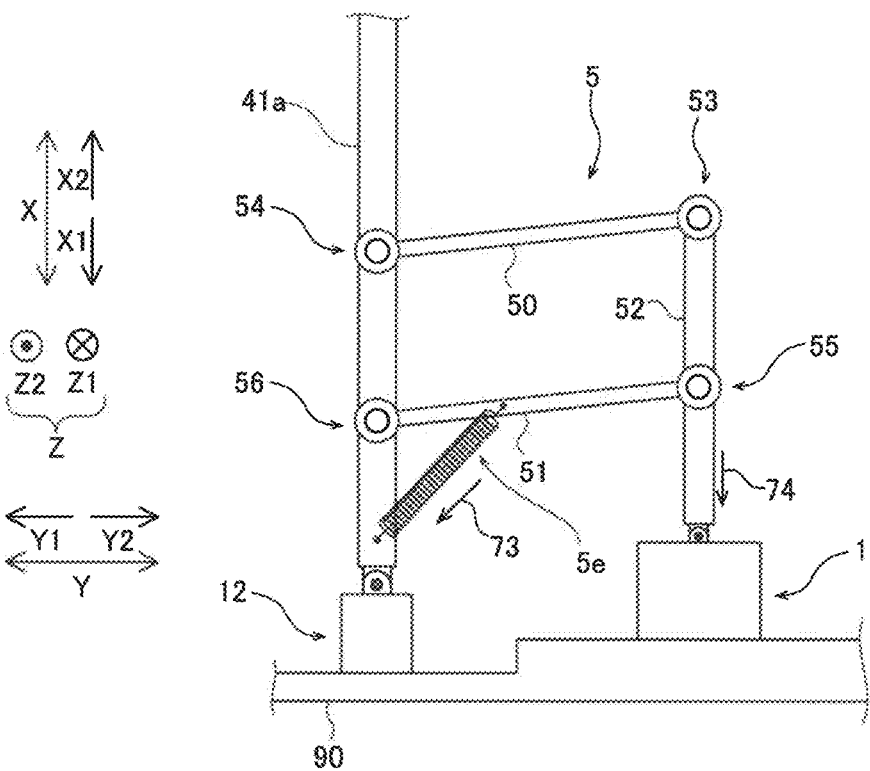
FIG. 10 is a schematic diagram of a defect inspection apparatus according to a third modification.

Specifically, as shown in FIG. 10, in the third modification, the connecting member 5 includes a first link 50, a second link 51, and a third link 52. The first link 50 and the second link 51 are configured to be extendable and retractable.

The first link 50 is connected to the third link 52 via a joint 53. The first link 50 is configured to be pivotable about the joint 53. The first link 50 is connected to the first leg 41a via a joint 54. The first link 50 is configured to be pivotable about the joint 54.

The second link 51 is connected to the third link 52 via a joint 55. The second link 51 is configured to be pivotable about the joint 55. The second link 51 is connected to the first leg 41a via a joint 56. The second link 51 is configured to be pivotable about the joint 56.

The third link 52 is connected to the first link 50 via the joint 53. The third link 52 is connected to the second link 51 via the joint 55. Further, the excitation unit 1 is provided at an end of the third link 52 opposite to the joint 53.

The first link 50 and the second link 51 are arranged in parallel to each other. When the third link 52 is moved in the X-direction, the first link 50 and the second link 51 pivot about the joint 54 and the joint 56, respectively. As a result, the third link 52 can be moved in the X-direction while keeping the angle of the third link 52 with respect to the inspection target 90. Accordingly, the connecting member 5 can adjust the position of the excitation unit 1 in the X-direction while keeping the angle of the excitation unit 1 with respect to the inspection target 90. The connecting member 5 is configured as a so-called link mechanism.

Further, the connecting member 5 includes a biasing member 5e for biasing the excitation unit 1 against the inspection target 90. The biasing member 5e is provided between the second link 51 and the first leg 41a to bias the second link 51 in the direction of the arrow 73. The biasing force by the biasing member 5e is applied to the excitation unit 1 via the second link 51 and the third link 52 as a biasing force in the direction of the the arrow 74. Note that in an example shown in FIG. 10, the first leg 41a is provided with the suction portion 12, but the contact member 13 (see FIG. 7) may be provided instead of the suction portion 12.

In the third modification, as described above, it is configured such that the connecting member 5 can adjust the position where the excitation unit 1 comes into contact with the inspection target 90. Therefore, even in a case where the surface of the inspection target 90 is uneven or the surface of the inspection target 90 is curved, the excitation unit 1 can be brought into close contact with the inspection target 90. Consequently, the excitation unit 1 can excite a predetermined elastic wave in the inspection target 90, which makes it possible to suppress the deterioration in the inspection accuracy.

Further, as described above, even in a case where, for example, the surface of the inspection target 90 is inclined due to the inclusion of the biasing member 5e for biasing the excitation unit 1 against the inspection target 90, it is possible to bring the excitation unit 1 into close contact with the inspection target 90 by the biasing force of the biasing member 5e. Consequently, since the excitation unit 1 can excite a predetermined elastic wave in the inspection target 90, it is possible to easily suppress the deterioration of the inspection accuracy.

(Fourth Modification)

Further, in the above-described embodiment, an example is shown in which the excitation unit 1 is provided in a state in which the relative position with respect to the first leg 41a is substantially fixed via the connecting member 5, but the present invention is not limited thereto. For example, the connecting member 5 may be configured to be rotatable in the circumferential direction about the first leg 41a.

Figure 11:
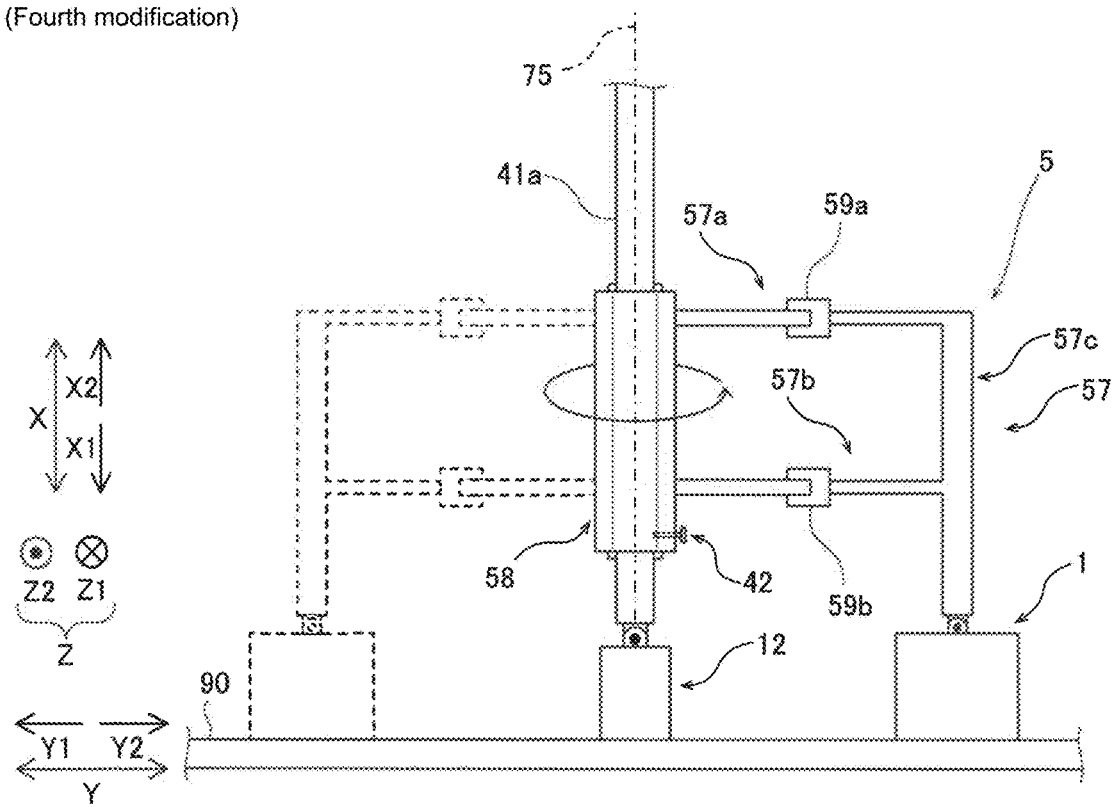
FIG. 11 is a schematic diagram of a defect inspection apparatus according to a fourth modification.

As shown in FIG. 11, in a fourth modification, the connecting member 5 includes a fourth link 57 and a cylindrical portion 58.

The fourth link 57 includes a first link 57a and a second link 57b each extending in the Y-direction and a third link 57c extending in the X-direction. The fourth link 57 is formed by integrally forming the first link 57a, the second link 57b, and the third link 57c. Further, the first link 57a and the second link 57b are provided with a connector 59a and a connector 59b, respectively. The connector 59a and the connector 59*b* are configured such that the first link 57*a* and the second link 57*b* can be extended and retracted in the Y-direction, respectively. Both the first link 57*a* and the second link 57*b* are connected to the cylindrical portion 58. The cylindrical portion 58 is configured to be rotatable about the center line 75 of the first leg 41*a*. Therefore, the connecting member 5 is configured to rotate the excitation unit 1 about the first leg 41*a*. The cylindrical portion 58 is configured to be movable in the direction along the first leg 41*a*. The inspector adjusts the position and the rotational angle of the cylindrical portion 58 so that the excitation unit 1 is placed at a predetermined position with respect to the first leg 41*a*, and performs an inspection of the inspection target 90 with the position of the cylindrical portion 58 fixed by the positioning member 42. In the example of FIG. 11, the first leg 41*a* is provided with the suction portion 12, but the contact member 13 (see FIG. 7) may be provided in place of the suction portion 12.

In the fourth modification, by configuring as described above, even in a case where the first leg 41*a* is arranged between the excitation unit 1 and the inspection area 90*a*, the position of the excitation unit 1 can be adjusted by rotating the excitation unit 1. Consequently, it becomes possible to prevent the first leg 41*a* from being arranged between the excitation unit 1 and the inspection area 90*a*, and therefore, a predetermined elastic wave can be excited with respect to the inspection area 90*a*.

(Fifth Modification)

In the above-described embodiment, an example is shown in which the suction portion 12 is provided on each of the plurality of legs 41, but the present invention is not limited thereto. For example, the contact member 13 may be provided on the plurality of legs 41.

Figure 12:
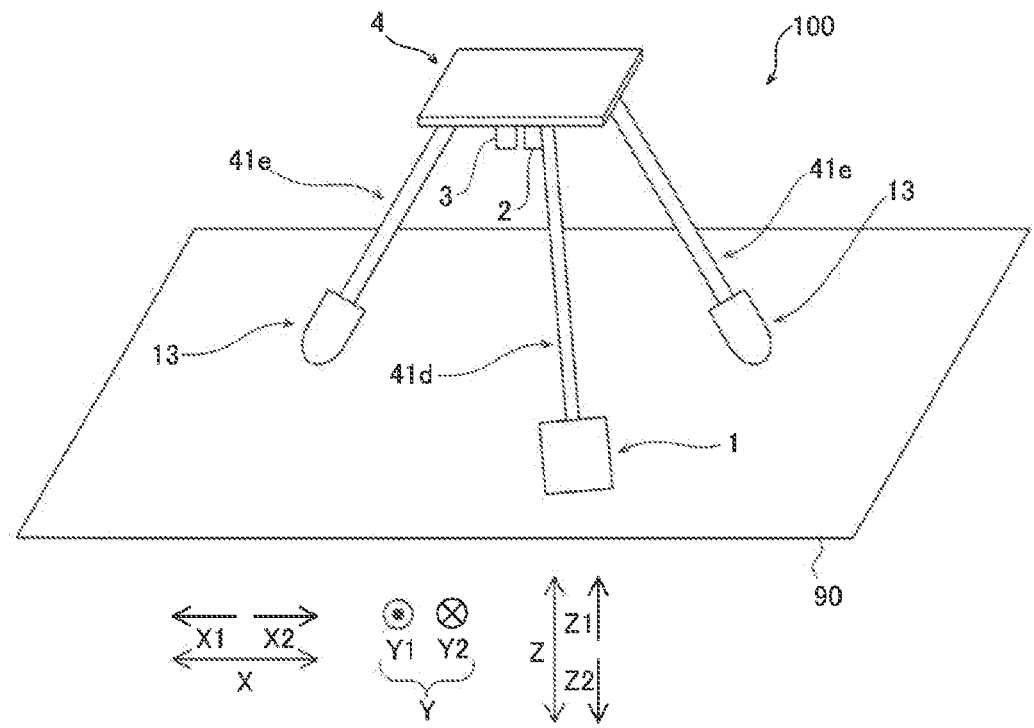
FIG. 12 is a schematic diagram of a defect inspection apparatus according to a fifth modification.

As shown in FIG. 12, in the fifth modification, the plurality of legs 41 includes an excitation leg 41*d* on which the excitation unit 1 is provided, and supporting legs 41*e* each supporting the holding member 4. Note that the fifth modification assumes the case in which the defect inspection apparatus 100 is arranged in the Z2-direction (the lower side in the vertical direction) to inspect the inspection target 90.

In the fifth modification, by configuring as described above, an elastic wave can be excited by the excitation leg 41*d*, and the holding member 4 can be supported by the supporting legs 41*e*. As a consequence, as compared with the configuration in which the holding member 4 is supported by suction portions 12, it is possible to prevent the number of components from increasing. Further, as compared with the configuration in which the suction portion 12 is provided, the frequency of maintenance of the supporting leg 41*e* can be suppressed from increasing, so that the burden on the inspector can be reduced. Further, since the holding member 4 and the excitation unit 1 are supported by the contact members 13, the inspector can perform an inspection without supporting the holding member 4. Consequently, as compared with the configuration in which an inspection is performed while supporting the holding member 4 by the inspector, it is possible to reduce the burden on the inspector. Further, since the inspector can perform an inspection without supporting the holding member 4, it is possible for the inspector to prevent vibrations from being transmitted to the holding member 4. Consequently, it is possible to suppress the generation of noises in the image 61 related to the propagation of the elastic wave.

Figure 13:
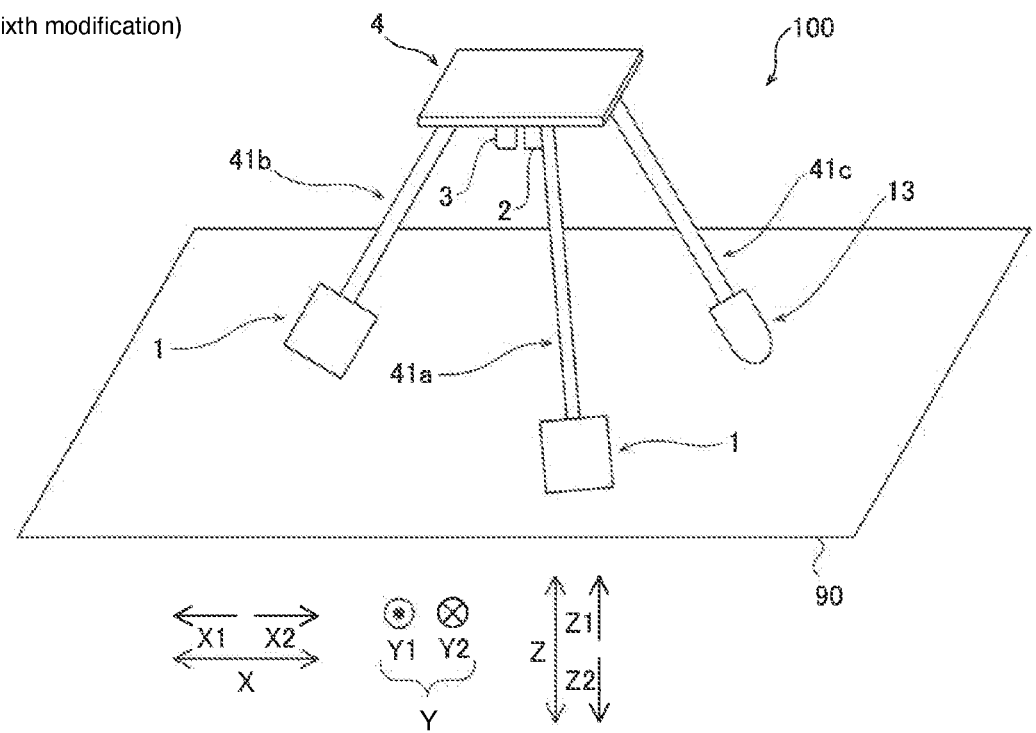
FIG. 13 is a schematic diagram of a defect inspection apparatus according to a sixth modification.

Further, in the above-described embodiment, an example is shown in which the excitation unit 1 is provided in any one leg (first leg 41*a*) out of the plurality of legs 41, but the present invention is not limited thereto. For example, like a sixth modification shown in FIG. 13, the excitation unit 1 may be provided on at least two legs 41 out of the plurality of legs 41 via the connecting member 5. In the example shown in FIG. 13, the excitation unit 1 is arranged at the first leg 41*a* and the second leg 41*b*.

Here, in the configuration in which an elastic wave is propagated from one place, the propagation of vibrations is weakened at the place where defects exist, which makes it difficult to detect the portions 80 and 81 in which the vibration state is discontinuous. Therefore, in the sixth modification, by configuring as described above, it is possible to make an elastic wave propagate from a plurality of places (two places) by the above-described configuration. As a consequence, it becomes possible to cause an elastic wave to propagate from a plurality of different locations. Therefore, unlike the configuration in which an elastic wave is caused to propagate from one location, it is possible to suppress the number of portions where it is difficult to detect defects from being increased due to weakened vibration propagation.

Figure 14:
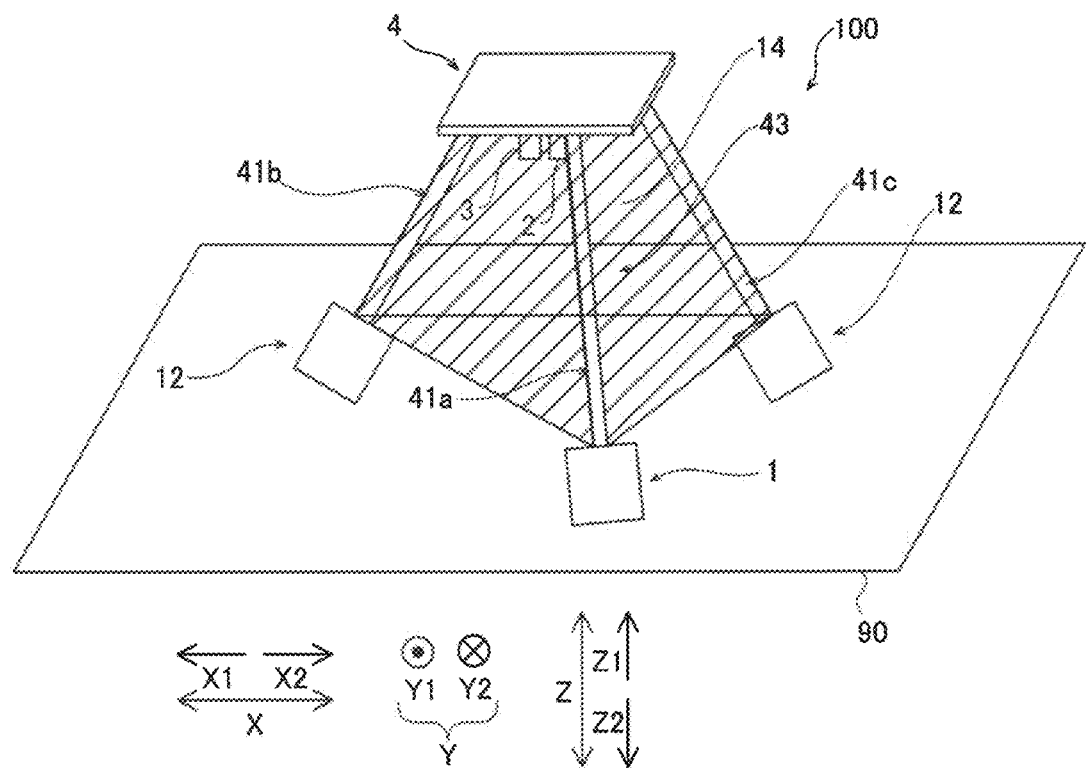
FIG. 14 is a schematic diagram of a defect inspection apparatus according to a seventh modification.

Further, in the above-described example, an example is shown in which a sheet or the like for shielding the space between the plurality of legs 41 is not provided, but the present invention is not limited thereto. For example, like the seventh modification shown in FIG. 14, each of the plurality of legs 41 is provided with a light shielding member 14 that covers the space 43 surrounded by the plurality of legs 41. Note that for convenience, the light shielding member 14 is hatched in FIG. 14. Further, in the example shown in FIG. 14, the three legs 41 are each provided with the light shielding member 14. But, for example, it may be configured such that four legs 41 are provided on the outer side of four corners of the inspection area 90*a* (see FIG. 2), and a light shielding member 14 is provided to cover the four legs 41 during imaging.

In the seventh modification, by configuring as described above, it is possible to eliminate the influence of external light, such as, e.g., sunlight, when performing an inspection of outdoors or the like. Further, since the laser light can be prevented from leaking from the inspection area 90*a* (see FIG. 2), it is possible to prevent the inspector from looking into the laser light. Consequently, the safety of the inspector can be ensured.

(Eighth Modification)

Figure 15:
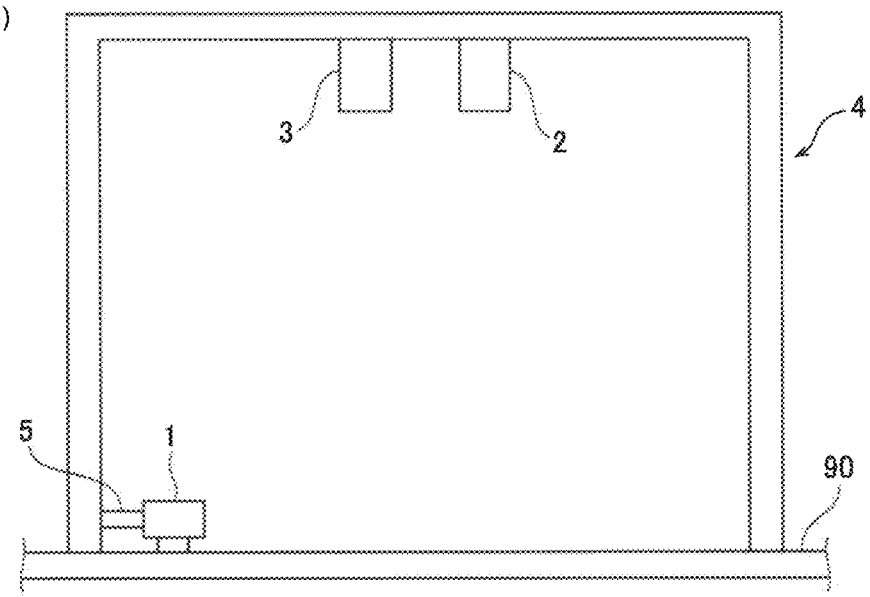
FIG. 15 is a schematic diagram of a defect inspection apparatus according to an eighth modification.

In the above-described embodiment, an example is shown in which the holding member 4 includes a plurality of legs 41, but the present invention is not limited thereto. For example, the excitation unit 1, the laser illumination unit 2, and the speckle-shearing interferometer 3 may be provided with respect to a holding member 4 having a box-shaped shape. As shown in FIG. 15, in the case of using the holding member 4 having a box-shape, the excitation unit 1 may be provided on the side surface of the holding member 4 via a connecting member 5.

(Other Modifications)

Further, in the above-described embodiments, an example is shown in which the speckle-shearing interferometer 3 including the interference unit 30 and the image sensor 31 is used, but the present invention is not limited thereto. For example, the interference unit 30 and the image sensor 31 may be provided separately. Further, the interference unit 30 may be configured by an interferometer other than the speckle-shearing interferometer 3.

Further, in the above-described embodiments, an example is shown in which the defect inspection apparatus 100 includes the vibration absorbing member 1*c*, but the present invention is not limited thereto. For example, the defect inspection apparatus 100 may not include the vibration absorbing member 1c. In a case where the defect inspection apparatus 100 is not provided with the vibration absorbing member 1c, the housing 1a of the excitation unit 1 and the vibrator 1b may be fixed by a plastic material or the like.

Further, in the above-described embodiments, the excitation unit 1 to be brought into contact with the inspection target 90 is used, but the present invention is not limited thereto. For example, a strong speaker or the like placed at a position where it does not come into contact with the front surface of the inspection target 90 may be used as the excitation unit 1.

Further, in the present invention, a window or various optical filters may be arranged on the optical path from the inspection target 90 until the reflected light enters the image sensor 31 to protect the optical components and improve the S/N ratio of the device, or the like.

In the above-described embodiments, the condenser lens 36 is arranged between the beam splitter 32 and the image sensor 31, but the present invention is not limited to this arrangement. In the present invention, the condenser lens 36 may be configured by a plurality of lenses or a plurality of lens groups.

Further, in the above-described embodiments, an example is shown in which the signal generator 7 and the excitation unit 1, and the laser illumination unit 2 are connected via cables 20 (wired), but the present invention is not limited thereto. In the present invention, the signal generator 7, the excitation unit 1, and the laser illumination unit 2 may be connected wirelessly.

In the above-described embodiments, an example is shown in which the holding member 4 includes three legs 41, but the present invention is not limited thereto. For example, the holding member 4 may be configured to include four legs 41. The number of legs 41 included in the holding member 4 may be any number.

In the above-described embodiments, the connecting member 5 has a flat plate shape, but the present invention is not limited thereto. The connecting member 5 may have any shape. For example, the excitation unit 1 may be connected to the first leg 41a by the string-like connecting member 5.

Further, in the above-described embodiments, an example in which the defect inspection apparatus 100 is configured to inspect an airframe of an airplane, but the present invention is not limited thereto. For example, the defect inspection apparatus 100 may be configured to inspect a bridge or the like. In the case of inspecting a bridge or the like, since there is a possibility that the suction portion 12 does not suction the bridge or the like, the leg 41 is preferably provided with a contact member 13.

Aspects

It will be understood by those skilled in the art that the above-described exemplary embodiments are concrete examples of the following aspects.

(Item 1)
A defect inspection apparatus comprising:
an excitation unit configured to excite an elastic wave in an inspection target;
a laser illumination unit configured to irradiate the inspection target with laser light;
an interference unit configured to cause the laser light reflected from mutually different positions of the inspection target excited by the excitation unit to interfere;
an imaging unit configured to image interfered laser light;
a holding member configured to hold the imaging unit at a position spaced apart from the inspection target by a predetermined distance;
a connecting member configured to connect the holding member or the imaging unit and the excitation unit; and
a controller configured to generate an image related to propagation of the elastic wave of the inspection target, based on the interfered laser light imaged by the imaging unit.

(Item 2)
The defect inspection apparatus as recited in the above-described Item 1, further comprising:
a vibration absorbing member provided between the excitation unit and the imaging unit, the vibration absorbing member being configured to absorb vibrations from the excitation unit.

(Item 3)
The defect inspection apparatus as recited in the above-described Item 1 or 2,
wherein the holding member includes an imaging unit holder for holding the imaging unit and a plurality of legs provided on the imaging unit holder, and
wherein the excitation unit is provided on any one of the plurality of legs via the connecting member.

(Item 4)
The defect inspection apparatus as recited in the above-described Item 1 or 2,
wherein the holding member is provided with an imaging unit holder for holding the imaging unit and a plurality of legs provided on the imaging unit holder, and
wherein the excitation unit is provided on at least two legs out of the plurality of legs via the connecting member.

(Item 5)
The defect inspection apparatus as recited in the above-described Item 3 or 4,
wherein the excitation unit is provided on the leg such that when the leg is brought into contact with the inspection target, the excitation unit is brought into contact with the inspection target at a position where a relative position of the excitation unit with respect to the imaging unit is determined in advance.

(Item 6)
The defect inspection apparatus as recited in the above-described Item 3 or 4,
wherein the excitation unit includes a housing, a vibrator, and the vibration absorbing member,
wherein the housing is connected to the leg via the connecting member,
wherein the vibrator and the vibration absorbing member are provided inside the housing, and
wherein the vibration absorbing member is provided between the housing and the vibrator.

(Item 7)
The defect inspection apparatus as recited in the above-described Item 3 or 4,
wherein the plurality of leg is provided with a suction portion for supporting the holding member by suctioning the inspection target, or a contact member to be brought into contact with the inspection target, and
wherein the excitation unit is provided on the leg together with the suction portion or the contact member.

(Item 8)
The defect inspection apparatus as recited in the above-described Item 7,
wherein the excitation unit is provided on the leg together with the plurality of suction portions.

(Item 9)
The defect inspection apparatus as recited in the above-described Item 7,
wherein the excitation unit is provided on the leg together with the contact member, and
wherein the suction portion is provided on the leg on which the excitation unit is not provided.

(Item 10)
The defect inspection apparatus as recited in the above-described Item 7,
wherein the excitation unit is integrally provided inside or outside the suction portion.

(Item 11)
The defect inspection apparatus as recited in the above-described Item 3 or 4,
wherein the connecting member is configured to be able to adjust a position where the excitation unit comes into contact with the inspection target.

(Item 12)
The defect inspection apparatus as recited in the above-described Item 11,
wherein the connecting member includes a biasing member for biasing the excitation unit against the inspection target.

(Item 13)
The defect inspection apparatus as recited in the above-described Item 11,
wherein the connecting member is configured to be rotatable in a circumferential direction about the leg.

(Item 14)
The defect inspection apparatus as recited in the above-described Item 3 or 4,
wherein the excitation unit is configured to excite the elastic wave in the inspection target by supplying a current via a cable, and
wherein the cable is accommodated inside the leg.

(Item 15)
The defect inspection apparatus as recited in the above-described Item 3 or 4,
wherein the plurality of legs includes an excitation leg on which the excitation unit is provided and a supporting leg supporting the holding member.

(Item 16)
The defect inspection apparatus as recited in the above-described Item 3 or 4, wherein the plurality of legs is each provided with a light shielding member for covering a space surrounded by the plurality of legs.

DESCRIPTION OF REFERENCE SYMBOLS

1: Excitation unit
1a: Housing
1b: Vibrator
1c: Vibration absorbing member
2: Laser illumination unit
4: Holding member
5: Connecting member
5e: Biasing member
6: Controller
12: Suction portion
13: Contact member
14: Light shielding member
20: Cable
30: Interference unit
31: Image sensor (imaging unit)
40: Interferometer holder (imaging unit holder)
41: Leg (a plurality of legs)
41a: First leg (a plurality of legs)
41b: Second leg (a plurality of legs)
41c: Third leg (a plurality of legs)
41d: Excitation unit leg
41e: Supporting leg
43: Space surrounded by a plurality of legs
61: Image about elastic wave transmission
90: Inspection target
100: Defect inspection apparatus

The invention claimed is:
1. A defect inspection apparatus comprising:
an excitation unit configured to excite an elastic wave in an inspection target;
a laser illumination unit configured to irradiate the inspection target with laser light;
an interference unit configured to cause the laser light reflected from mutually different positions of the inspection target excited by the excitation unit to interfere;
an imaging unit configured to image interfered laser light;
a holding member configured to hold the imaging unit at a position spaced apart from the inspection target by a predetermined distance;
a connecting member configured to connect the holding member or the imaging unit and the excitation unit;
a controller configured to generate an image related to propagation of the elastic wave of the inspection target, based on the interfered laser light imaged by the imaging unit, and
a vibration absorbing member provided between the excitation unit and the imaging unit, the vibration absorbing member being configured to absorb vibrations from the excitation unit.

2. The defect inspection apparatus as recited in claim 1,
wherein the holding member includes an imaging unit holder for holding the imaging unit and a plurality of legs provided on the imaging unit holder, and
wherein the excitation unit is provided on any one of the plurality of legs via the connecting member.

3. The defect inspection apparatus as recited in claim 1,
wherein the holding member is provided with an imaging unit holder for holding the imaging unit and a plurality of legs provided on the imaging unit holder, and
wherein the excitation unit is provided on at least two legs out of the plurality of legs via the connecting member.

4. The defect inspection apparatus as recited in claim 2,
wherein the excitation unit is provided on the leg such that when the leg is brought into contact with the inspection target, the excitation unit is brought into contact with the inspection target at a position where a relative position of the excitation unit with respect to the imaging unit is determined in advance.

5. The defect inspection apparatus as recited in claim 2,
wherein the excitation unit includes a housing, a vibrator, and the vibration absorbing member,
wherein the housing is connected to the leg via the connecting member,
wherein the vibrator and the vibration absorbing member are provided inside the housing, and
wherein the vibration absorbing member is provided between the housing and the vibrator.

6. The defect inspection apparatus as recited in claim 2,
wherein the plurality of legs is provided with a suction portion for supporting the holding member by suctioning the inspection target, or a contact member which comes into contact with the inspection target, and wherein the excitation unit is provided on the leg together with the suction portion or the contact member.

7. The defect inspection apparatus as recited in claim 6, wherein the excitation unit is provided on the leg together with the suction portion.

8. The defect inspection apparatus as recited in claim 6, wherein the excitation unit is provided on the leg together with the contact member, and
wherein the suction portion is provided on the leg on which the excitation unit is not provided.

9. The defect inspection apparatus as recited in claim 6, wherein the excitation unit is integrally provided inside or outside the suction portion.

10. The defect inspection apparatus as recited in claim 2, wherein the connecting member is configured to be able to adjust a position where the excitation unit comes into contact with the inspection target.

11. The defect inspection apparatus as recited in claim 10, wherein the connecting member includes a biasing member for biasing the excitation unit against the inspection target.

12. The defect inspection apparatus as recited in claim 10, wherein the connecting member is configured to be rotatable in a circumferential direction about the leg.

13. The defect inspection apparatus as recited in claim 2, wherein the excitation unit is configured to excite the elastic wave in the inspection target by supplying a current via a cable, and
wherein the cable is accommodated inside the leg.

14. The defect inspection apparatus as recited in claim 2, wherein the plurality of legs includes an excitation leg on which the excitation unit is provided and a supporting leg supporting the holding member.

15. The defect inspection apparatus as recited in claim 2, wherein the plurality of legs is each provided with a light shielding member for covering a space surrounded by the plurality of legs.

16. The defect inspection apparatus as recited in claim 3, wherein the excitation unit is provided on the leg such that when the leg is brought into contact with the inspection target, the excitation unit is brought into contact with the inspection target at a position where a relative position of the excitation unit with respect to the imaging unit is determined in advance.

17. The defect inspection apparatus as recited in claim 3, wherein the excitation unit includes a housing, a vibrator, and the vibration absorbing member,
wherein the housing is connected to the leg via the connecting member,
wherein the vibrator and the vibration absorbing member are provided inside the housing, and
wherein the vibration absorbing member is provided between the housing and the vibrator.

18. The defect inspection apparatus as recited in claim 3, wherein the plurality of legs is provided with a suction portion for supporting the holding member by suctioning the inspection target, or a contact member which comes into contact with the inspection target, and
wherein the excitation unit is provided on the leg together with the suction portion or the contact member.

19. The defect inspection apparatus as recited in claim 3, wherein the connecting member is configured to be able to adjust a position where the excitation unit comes into contact with the inspection target.

20. The defect inspection apparatus as recited in claim 3, wherein the excitation unit is configured to excite the elastic wave in the inspection target by supplying a current via a cable, and
wherein the cable is accommodated inside the leg.

21. The defect inspection apparatus as recited in claim 3, wherein the plurality of legs includes an excitation leg on which the excitation unit is provided and a supporting leg supporting the holding member.

22. The defect inspection apparatus as recited in claim 3, wherein the plurality of legs is each provided with a light shielding member for covering a space surrounded by the plurality of legs.

23. A defect inspection apparatus comprising:
an excitation unit configured to excite an elastic wave in an inspection target;
a laser illumination unit configured to irradiate the inspection target with laser light;
an interference unit configured to cause the laser light reflected from mutually different positions of the inspection target excited by the excitation unit to interfere;
an imaging unit configured to image interfered laser light;
a holding member configured to hold the imaging unit at a position spaced apart from the inspection target by a predetermined distance so that the imaging unit does not change from a predetermined distance from the inspection target;
a connecting member configured to connect the holding member or the imaging unit and the excitation unit;
a controller configured to generate an image related to propagation of the elastic wave of the inspection target, based on the interfered laser light imaged by the imaging unit, and
a vibration absorbing member provided between the excitation unit and the imaging unit, the vibration absorbing member being configured to absorb vibrations from the excitation unit.

24. A defect inspection apparatus comprising:
an excitation unit configured to excite an elastic wave in an inspection target;
a laser illumination unit configured to irradiate the inspection target with laser light;
an interference unit configured to cause the laser light reflected from mutually different positions of the inspection target excited by the excitation unit to interfere;
an imaging unit configured to image interfered laser light;
a holding member including an imaging unit holding part for holding the imaging unit and a plurality of legs provided on the imaging unit holding part, and configured to hold the imaging unit at a position spaced apart from the inspection target by a predetermined distance;
a connecting member configured to connect the holding member or the imaging unit and the excitation unit;
a controller configured to generate an image related to propagation of the elastic wave of the inspection target, based on the interfered laser light imaged by the imaging unit, and
a vibration absorbing member provided between the excitation unit and the imaging unit, the vibration absorbing member being configured to absorb vibrations from the excitation unit.

25. A defect inspection apparatus comprising:
an excitation unit configured to excite an elastic wave in an inspection target;
a laser illumination unit configured to irradiate the inspection target with laser light;

an interference unit configured to cause the laser light reflected from mutually different positions of the inspection target excited by the excitation unit to interfere;

an imaging unit configured to image interfered laser light;

a holding member configured to hold the imaging unit at a position spaced apart from the inspection target by a predetermined distance;

a connecting member configured to connect the holding member or the imaging unit and the excitation unit;

a controller configured to generate an image related to propagation of the elastic wave of the inspection target, based on the interfered laser light imaged by the imaging unit, and a vibration absorbing member configured to absorb vibrations from the excitation unit and bias the excitation unit so as to come into close contact with the inspection target.

* * * * *